United States Patent [19]

Steinbeck

[11] Patent Number: 4,971,281
[45] Date of Patent: Nov. 20, 1990

[54] ANTI-DISLODGEMENT MECHANISM

[75] Inventor: Linn A. Steinbeck, Kent, Wash.

[73] Assignee: Hon Industries Inc., Muscatine, Iowa

[21] Appl. No.: 354,795

[22] Filed: May 22, 1989

[51] Int. Cl.$^5$ .............................................. F16L 3/08
[52] U.S. Cl. ............................... 248/225.2; 211/192;
248/222.1
[58] Field of Search ............... 248/225.2, 222.1, 222.2,
248/223.4, 224.4, 225.1, 227, 243, 246; 211/192

[56] References Cited

U.S. PATENT DOCUMENTS

| | | |
|---|---|---|
| 3,291,194 | 12/1966 | Kirtley et al. |
| 3,601,432 | 8/1971 | Fenwick et al. ............. 248/222.1 X |
| 4,048,768 | 9/1977 | Good .......................... 248/222.1 X |
| 4,154,419 | 5/1979 | Breidenbach .................. 211/192 X |
| 4,189,123 | 2/1980 | Johnson . |
| 4,324,379 | 4/1982 | Ovitz, III . |
| 4,534,529 | 8/1985 | Dorner . |
| 4,541,599 | 9/1985 | Schoumaker . |
| 4,618,064 | 10/1986 | Viklund ............................... 211/192 |
| 4,671,481 | 6/1987 | Beard .............................. 248/222.1 |

Primary Examiner—Ramon O. Ramirez
Attorney, Agent, or Firm—Neuman, Williams, Anderson & Olson

[57] ABSTRACT

A bracket assembly such as is used for hanging office furnishing components on vertical supports, e.g., slotted posts of office partition systems, includes a mounting bracket with a plurality of aligned, coplanar hooks for engagement with aligned slots of such supports and an interlock member pivotally mounted on the bracket, with a cam section at one end and a locking projection at the other. The cam section is positioned to enter a slot as the bracket is engaged on the support and thereafter engages the lower edge of the slot as the bracket is seated to rotate the interlock member and extend the locking projection into another of the slots. The locking projection is positioned to enter the slot as the interlock is rotated by the cam and thereafter is held in the slot by the interlock to preclude raising of the bracket for disengagement of the hooks except upon counterrotation of the interlock member by the user.

11 Claims, 1 Drawing Sheet

U.S. Patent    Nov. 20, 1990    4,971,281
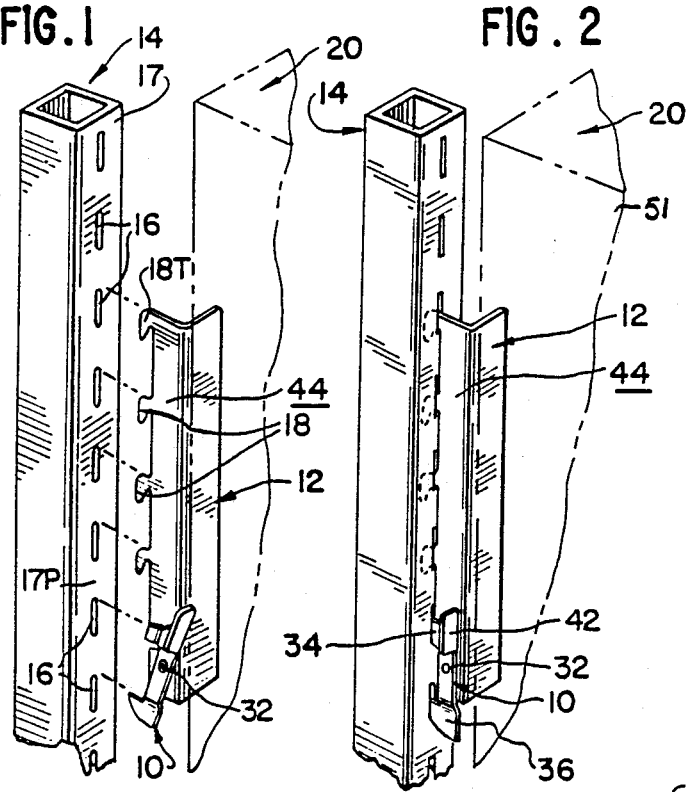
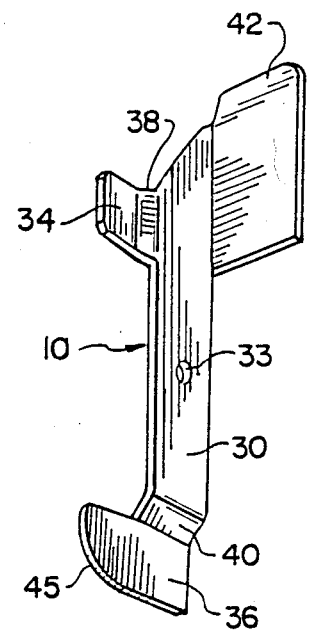
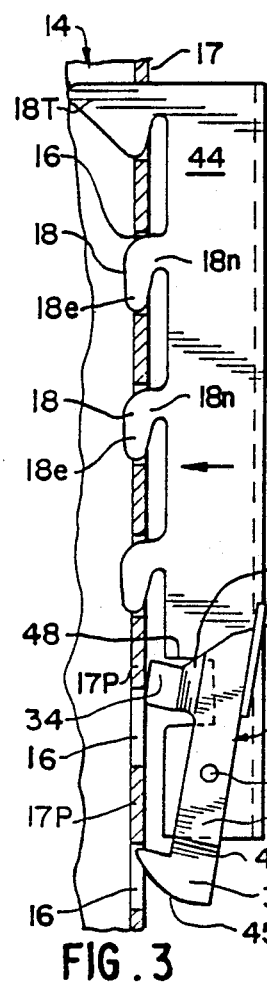
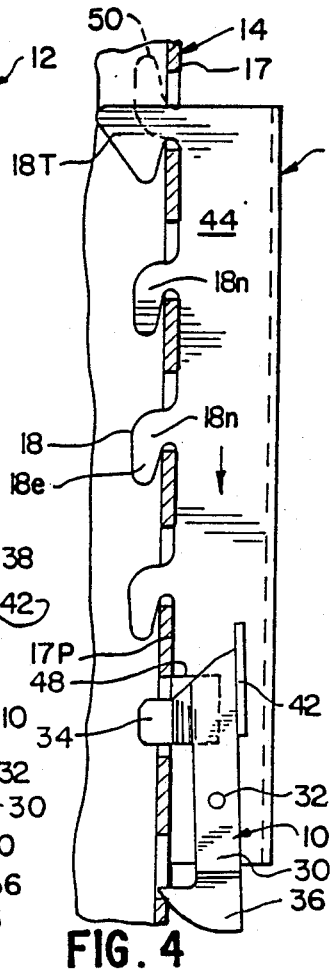
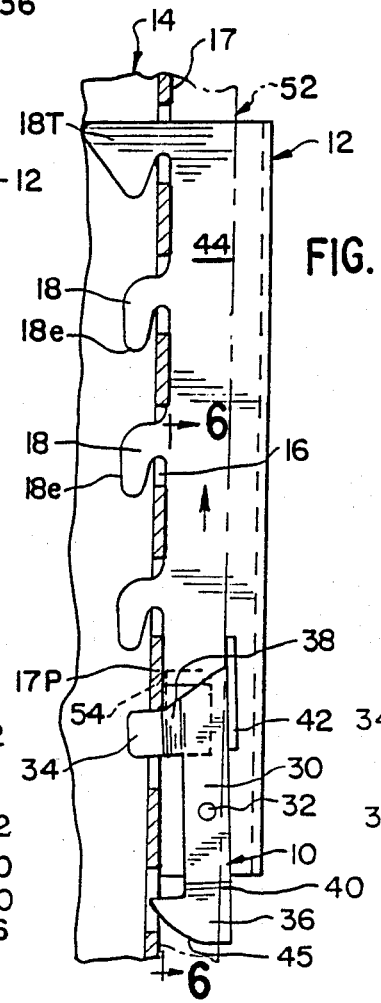
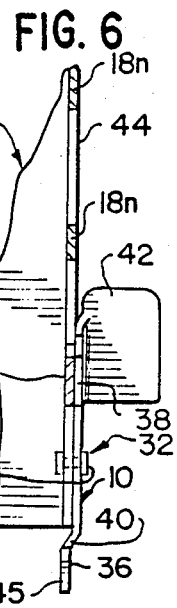

ANTI-DISLODGEMENT MECHANISM

BACKGROUND OF THE INVENTION

This invention relates generally to a locking system for use in modular office space systems. In particular, the locking system is for use with a mounting bracket to prevent dislodgement of suspended office components. The present invention provides a self-locking mechanism to secure the mounting bracket in position and thereby prevent suspended components from being bumped, jarred or otherwise inadvertently dislodged from the wall while also permitting easy intentional removal.

The typical office modular system consists of assembled partition panels and various furniture components, including storage units, desk tops, cabinets, shelves, and the like. The location and number of the components vary greatly in an office from time to time. To meet the changing needs in an office, suspension or hanging and removal of the componentry should be easily effected to allow an efficient use of office space.

It is common practice to secure office components to slotted vertical support posts or standards which typically are part of the office partitions or are otherwise rigidly secured to the interior of a wall. Brackets including a plurality of hooks which are adapted to fit into the slots of the vertical supports are typically attached to the rear portions of componentry. The componentry and attached brackets are then placed on the vertical supports with the hooks engaged through the slots in those supports and holding the componentry in place.

However, dislodgement of the office componentry can frequently occur. For example, a person may inadvertently bump the office component. In some such cases, the bracket supporting the component may be lifted out of the slots of the vertical standard, and the cabinet or desk top may become unstable.

Systems for locking the hanging brackets in the slotted standards have been proposed in the past but they have suffered from various problems. In particular, such locking systems have been unnecessarily complex, often comprising spring-loaded components and the like. Although these systems may work effectively when new, they tend to be expensive and breakdowns from wear may occur. Thus, there is a likelihood that these mechanisms will malfunction upon installation or disassembly of the office system. This can be particularly frustrating in the modern day office which is frequently rearranged.

Less complex mechanisms have also been proposed. However, their shortcomings lie in their inability to completely solve the locking problem. For example, setting the device to the locked position still requires deliberate manual operation. Thus, these mechanisms lack adequate versatility and flexibility, in that they are often difficult to install, and cannot be quickly assembled and disassembled without employing skilled personnel for this purpose.

It is an object of this invention to provide a simple and inexpensive locking system which overcomes the shortcomings of the prior art and provides effective, secure and positive automatic locking of components to a slotted support and yet permits convenient intentional release.

SUMMARY OF THE INVENTION

The present invention provides an office furniture component locking system which is of a simple design and is effective and self-actuating in operation. In accordance with one embodiment, a locking system comprises a pivoting interlock member attached to a mounting bracket having hooks for engaging slots in a vertical standard. The pivoting interlock member is attached to the bottom portion of the outward side of the mounting bracket and rotates about a pivot between locked and unlocked positions.

The main structural features of the interlock member include a pivoting latch arm, a locking tab, a cam section, and a thumb tab. The locking tab is attached to the latch arm above the pivot and is adapted to engage a slot in the vertical standard when the locking system is in the locked position. The cam section is attached to the latch arm below the pivot. This both insures that the locking tab is retracted as installation is initiated and automatically forces the locking tab to engage a slot in the vertical standard when the bracket is lowered into place in supportive engagement with the slotted standard. Thereafter, the cam section also prevents the latch arm from counter rotation which would unlock the bracket locking system. Further, the locking tab and the cam are offset from the latch arm and linearly align with the bracket hooks to ease mounting of the bracket into the aligned engagement slots normally provided in conventional vertical support standards. A thumb tab for manually disengaging the locking system is also attached to the latch arm above the pivot, protruding transverse to the locking tab for convenient intentional unlocking of the system.

The bracket contains a recess for laterally receiving the locking tab. The locking tab abuts the bottom edge of this recess when the locking tab is fully extended for engagement in a slot in the vertical standard. Thus, the bottom edge of the recess provides a stop to prevent the latch from swinging out of its operating range while disengaged and also assists in preventing the locking tab from further rotation after the cam forces the locking tab to the locked position.

When the interlock member is secured in the locked position, an upward force cannot dislodge the bracket. The bracket remains secured to the vertical standard because the locking tab abuts the top of its respective slot in the vertical standard and thereby prevents disengagement of the support hooks from the standard. The bracket may only be removed by an upward movement of the bracket with simultaneous release of the locking tab from the respective slot by deliberate counter rotation of the interlock member.

Despite the simple design of the device, it is entirely self-actuating into the locking mode. The cam rotates the locking tab into the locked position by the placement of the bracket on the slotted standard. Also, it is easy to effect intentional release for deliberate removal of suspended components.

BRIEF DESCRIPTION OF THE DRAWINGS

For a more complete understanding of the invention, reference should now be made to the embodiments illustrated in greater detail in the accompanying drawings and described below by way of example.

In the drawings:

FIG. 1 is a perspective view of a bracket locking system employing teachings of this invention, prior to mounting and with a supported component shown in phantom lines.

FIG. 2 is a perspective view of the system of FIG. 1 in the mounted support position and showing the pivoting interlock member in the locked position.

FIG. 3 is a side view of the mounting bracket system of FIG. 1 with the interlock member in the unlocked positions, as during a mounting engagement or disengagement operation.

FIG. 4 is a side view of the mounting bracket of FIG. 1 with the interlock member in the locked position upon self actuation by the cam.

FIG. 5 is a side view of the mounting bracket of FIG. 1 with the interlock member in the locked position and illustrating the effect of an upward force thereon.

FIG. 6 is an enlarged front view of the interlock member and part of the associated bracket, as taken along line 6—6 of FIG. 5.

FIG. 7 is a perspective view of the interlock member.

It should be understood that the drawings are not necessarily to scale and that an embodiment is sometimes illustrated in part by fragmentary views. In certain instances, details of the actual structure which are not necessary for the understanding of the present invention may have been omitted. It should be understood, of course, that the invention is not necessarily limited to the particular embodiments illustrated herein.

DETAILED DESCRIPTION OF THE DRAWINGS

Referring first to FIGS. 1 and 2, a mounting bracket 12 utilizing the present invention is shown. The mounting bracket 12 includes a plurality of modularly spaced hooks 18 which engage a linear series of complementary uniformly spaced slots 16 in the outwardly exposed wall 17 of a hollow vertical support 14. A furniture component 20 is shown fixedly attached to the mounting bracket 12.

The locking system is comprised of an interlock member 10 attached to the mounting bracket 12 by a pivot attachment means 32, and rotatable about the pivot 32. FIG. 7 shows a perspective view of the interlock member 10.

The illustrated member 10 is comprised of an elongated pivotable latch arm 30, a forwardly extending locking tab 34 at one end, located above a pivot mounting means aperture 33, and a forwardly extending cam section 36 at the other end, below the pivot mounting means. The locking tab 34 is offset on the mounting side of the main arm portion by a first offset portion 38. The cam section 36 is similarly offset by a second offset portion 40. Thereby the locking tab and the cam section are generally aligned with the hooks 18 of the bracket 12 when the interlock member is mounted on the outer side of the bracket flange 44, as illustrated in FIG. 6. This positions the locking tab and cam sections for engagement with appropriate slots 16 within the linear array of such slots common on support posts 14, as will be noted further below. A manual actuating means and stop means comprising a thumb tab 42 projects outwardly on the side of arm 30 opposite the tab 34 and the cam 36. The illustrated thumb tab extends generally normal to the primary plane of the arm 30. The interlock member preferably is a single unitary component, such as being an appropriately formed piece of sheet metal, as seen in FIG. 7.

The spacing of the tab 34 and the cam extension 36 from one another differs from the spacing of the slots 16 such that both cannot fully enter the slots 16 at the same time. This relationship is utilized to obtain a rocker motion of the interlock member, as will be noted further below.

The locking member 10 is mounted to the bracket 12, on the flange 44 which corresponds to the plane of the hooks 18, by any suitable pivotal mounting means. For example, a stud (not shown) on the flange 44 may be engaged in aperture 33 or a rivet 35 may engage the aperture 33 and a corresponding aperture suitably provided in the bracket to provide the pivot means 32 a shown in FIG. 6. The positioning of the locking member and/or the provision of suitable cutouts or recesses in the flange 44 accommodate positioning of the offset tab 34 and cam section 36 in alignment with the flange 44 and thus with the hooks 18 for engagement with the slots 16. In the illustrated embodiment this alignment is permitted by the positioning of the offset cam section below the lower end of the bracket 12 and by providing a recess in the form of notch 48 in the outer edge of flange 44 to receive the offset tab 34.

Further, the locking member 10 is positioned longitudinally of the bracket 12 such that the cam section 36 will be received in one of the slots 16 of a support 14 when the hooks of the bracket are being inserted into other slots 16 of that same support, see FIG. 3. The positioning of the locking tab 34 is such that it will not simultaneously enter a slot 16. Rather, the tab 34 will abut a portion of the front wall 17p of the support adjacent the slots until the bracket 12 is lowered to engage the lower distal ends 18e of the hooks behind the portions of wall beneath the respective slots 16, whereupon the tab 34 may enter the respective slot 16, see FIG. 4. To these ends, the cam section 36 is positioned to be spaced from the adjacent hook 18 approximately at an equal multiple of the modular spacing between hooks and between the slots 16, i.e., in the position which would be occupied by another hook in the series. However, the locking tab 34 is positioned approximately at or slightly above the position which would be occupied by the neck 18n of another hook at the corresponding normal modular position, but at a spacing from the end 18e of the next adjacent hook which is less than the vertical dimension of the portion of wall 17 between the slot 16 engaged by that adjacent hook and the slot 16 engaged by the locking tab 34, see, e.g., the wall portion 17P in FIG. 4.

FIG. 3 illustrates a side view of the bracket 12 and interlock member 10 in an unlocked position, as the bracket is being engaged onto a slotted vertical support member 14 with the hooks entering an aligned set of the series of slots 16. As the bracket 12 is inserted and lowered into engagement on the support 14, toward the position of FIG. 4, the hooks 18 engage over respective portions 17P of the support wall 17 beneath the slots 16 in the usual manner, typically with a camming action effected by tapered inner surfaces of their ends 18e. This assures a firm mounting engagement by virtue of the weight of the bracket and of the attached component.

The top end hook 18T may have a tapered shape at the outer lead edge, such as shown in FIGS. 1–5, to facilitate guiding of the bracket into position for alignment of the hooks with the slots 16. Alternatively, a reversed "hook" or prong projection may be provided at the upper end of the bracket 12 to be extended inward through the respective slot and upward, as illustrated in phantom at 50 in FIG. 4, to further assist in retention of the bracket on an engaged support. In that version, the bracket is tilted to first insert the top projection in the appropriate slot, and the bracket is then pivoted about the neck of that projection to insert the lower hooks 18 and cam section 36. Brackets having all of the hooks turned downward as in the illustrated embodiment may be mounted with similar motions or by a simple transverse movement relative to the supports 14.

As noted above and seen in FIG. 3, when the hooks 18 are aligned with the slots 16, the tab 34 abuts a portion of the support wall 17 above one of the slots and the cam extension 36 is aligned with a slot. This assures initial rotation of the locking member (clockwise in FIGS. 3-5) to retract the tab 34 and concomitantly extend the cam tab 36 into the respective slot 16, automatically, in the normal course of engaging the bracket 12 onto a typical slotted standard 14. This positions the cam section 36 in its active position for subsequently driving the locking member to its locking position as the bracket and mounted component are lowered from the position of FIG. 3 to the final seated position of FIG. 4.

As the component and attached bracket 12 are lowered from the position of FIG. 3 to that of FIG. 4, the tab 34 moves into alignment with the respective slot 16. Thereupon, the lower arcuately shaped cam edge surface 45 of section 36 reacts against the wall 17 at the lower edge of the respective slot 16 to force retraction of this section. As a result, the continued downward movement of the bracket simultaneously forces the locking member 10 to rotate (counterclockwise in FIGS. 3-5) and thereby extends the locking tab 34 into the respective aligned slot 16 as the bracket reaches its fully seated downward position as in FIG. 4.

FIG. 4 illustrates a side view of the bracket 12 and the interlock member 10 in the locked position. When the bracket 12 is completely engaged with the standard 14, the cam 36 has rotated the locking tab 34 into a slot 16 of the standard. The cam 36 remains engaged with the wall 17 to prevent counterrotation of the interlock member 10 and thus prevents disengagement of the tab 34 from the support 14 unless and until the bracket is moved upward to realign the cam section with the adjacent slot 16.

As noted above, a notch 48 in the bracket wall flange 44 defines a recess to receive the locking tab 34, which is offset into this recess. The bottom edge of the cutout notch 48 abuts the locking tab 34, thereby preventing the locking tab 34 from further rotation counterclockwise from the position of FIG. 4 even though there is a downward force applied to tab 34.

In the usual installation of partition panels, the supports 14 are recessed relative to the finish surfaces of the panels, represented by the phantom line 52 in FIG. 5. The bracket flanges 44 extend through the joints between two such panels for engagement of the hooks 18 in the supports 14. The main body 30 and tab portions 34 and 36, i.e., all of the interlock member 10 except tab 42, is of a thin profile closely adjacent to the flange 44, as best seen in FIG. 6, to accommodate insertion of the bracket with the interlock mounted thereon through such interpanel joints. Moreover, the spacing of the tab 42 from the distal or leading edge of the bracket corresponds generally to the thickness of the panels as measured outward from the supports 14, as also seen in FIG. 5, and that tab is of a lateral extent to overlie one of the respective panels 51 (FIG. 2). Thus engagement of tab 42 on an adjacent panel 52 serves as another stop to preclude further inward rotation of the interlock member, counterclockwise in FIG. 5.

The portion of the locking member above the tab 34 also may extend upward generally parallel and adjacent to the outer edge of flange 44, as shown in phantom at 54, to abut the support wall 17 above the slot and thereby prevent such further rotation.

FIG. 5 illustrates the effect of application of an unintentional upward force to the bracket 12, whether applied directly to the bracket or to the attached furniture component. The locking tab 34 abuts the wall 17 at the top edge of its slot 16. This limits the upward movement of the bracket and thereby prevents the hooks 18 from disengaging from the wall portions beneath the respective slots 16. Various aspects of the structure preclude concomitant rotation of the locking member which could release the locking effect provided by the engaged tab 34. The projection of the tab outwardly of the bracket relative to the pivot 32, to the left in FIGS. 3-5, means that the forces of engagement of the tab with the wall 17 at the upper edge of the notch tend to rotate the locking member further in an engagement direction, i.e., counterclockwise in FIG. 5. However, further rotation in this direction is precluded by engagement of the lower edge of tab 34 on the lower edge of the notch 48, as well as by the engagement of tab 42 with a panel 51 (FIG. 2), and/or by other means as noted. Accordingly, the engagement of tab 34 in the respective slot 16, combined with the fact that in this condition the hooks remain engaged over the wall portions 17P at their lower ends 18e and thereby preclude further outward movement of the bracket 12 from the support wall 17, precludes dislodgement of the bracket from the support 14.

The engagement of tab 34 in the notch 48 also assures that the locking member 10 will be captured and retained within its operating range positions at all times, even when the bracket is disengaged and/or in positions other than vertical as in the drawings. Thus, for example, the tab 34 will be in the operative position of FIG. 3 whenever the user is mounting a component 20.

The notch 48 also may be of shallow depth such that the offset 38 will engage the inward edge of the notch and require forcible engagement of a part of tab 34 onto flange 44 by deflection of the arm 30 to permit disengagement of the tab from its slot 16 prior to alignment of the hooks 18 with their respective slots 16. This will further assure against unintentional disengagement of the locking member by rotation clockwise in FIGS. 3-5 as the assembly is moved upward either intentionally or unintentionally. A biasing element, such as a coil spring, also may be applied between the arm 30 and the bracket 12 to preclude inadvertent unlocking counter rotation of the member 10.

The thumb tab 42 is attached to the latch arm 30 and is located above the pivot 32 and transverse to the locking tab 34. When it is desired to intentionally disengage the bracket 12, such as in removing a supported furniture component 20, the component with bracket 12 is lifted upward. The thumb tab 42 is simultaneously pulled outward from the support 14 by the operator thereby releasing the locking tab 34 from a slot 16 and allowing the bracket hooks 18 to be released from the slots 16 of the support standard 14. The cam section 36 of course may enter the respective slot 16 as the assembly is raised to permit this unlocking rotation of member 10.

Other embodiments may be implemented. For example, one could utilize other means then the thumb tab 42 for disengaging the locking tab 34 from a slot 16. By way of illustration, a tab could be placed below the pivot 32 and used to force the cam section 36 inward, or the user could press inward on the section 36 without a specific tab target, causing the same disengaging rotation of the interlock member 10. Further, one could adapt the present invention for use in any system using a bracket with hooks which engage a mounting surface with slots or other apertures in appropriate complementary positions. For example, the apertures could be spread horizontally in a different array rather than in a vertical linear alignment on a vertical standard as is typically used in office space partition systems. However, the invention is especially suited to the latter arrangement.

It will be seen that a very simple, inexpensive and advantageous locking assembly has been provided which meets the objects of this invention.

While particular embodiments of the invention have been shown or described, it will be understood, of course, that the invention is not limited thereto since modifications may be made and other embodiments utilizing this invention will occur to those skilled in the art to which this invention pertains, particularly upon considering the foregoing teachings.

What is claimed is:

1. A mounting bracket assembly for supporting office furnishing components on generally vertical support members each provided with a plurality of vertically aligned engagement slots, comprising:
   a support bracket which includes a plurality of hook elements projecting in generally coplanar alignment with one another at one side of said bracket, said hook elements shaped and arranged for supportably engaging such a support member by movement of said bracket transversely to such a support member to insert such hooks thereof into a group of said slots and then downwardly to engage said hooks on the portions of such support member immediately beneath the respective slots;
   an interlock member pivotally mounted on said bracket for pivotal movement, relative to said bracket, about a pivot axis generally normal to the coplanar alignment of said hook elements;
   a locking projection on said interlock member at one side of said pivot axis and extending generally parallel to said hook elements for selective projection into one of such slots of such a support member on which said bracket assembly is engaged;
   a cam section on said interlock member at the opposite side of said pivot axis and extending in a direction generally parallel to said hook elements;
   said locking projection being disposed, longitudinally of said bracket, such that it will abut such support member without entering one of said slots therein as said hooks are moved transversely into their respective slots and will be aligned with one of said slots in the course of such downward movement of said bracket by which said hooks are engaged;
   said cam section having a cam surface positioned to engage a portion of such support member during such downward movement of said bracket to cause retractive movement of said cam section and thereby to rotate said interlock member to extend said locking element into its respective aligned slot in the course of such downward movement of said bracket; and
   the configuration and relative positioning of said hooks and said locking element being such that said locking element engages such support member in the respective slot to preclude vertical movement of said bracket which would permit transverse disengagement of said hooks from their respective slots.

2. A mounting bracket assembly for supporting office furnishing components on generally vertical support members each provided with a plurality of vertically aligned engagement slots, comprising:
   a support bracket which includes a plurality of hook elements projecting in generally coplanar alignment with one another at one side of said bracket, said hook elements shaped and arranged for supportably engaging such a support member by movement of said bracket transversely to such a support member to insert such hooks thereof into a group of said slots and then downwardly to engage said hooks on the portions of such support member immediately beneath the respective slots;
   an interlock member pivotally mounted on said bracket for pivotal movement, relative to said bracket, in a plane generally parallel to the coplanar alignment of said hook elements and about a pivot axis intermediate first and second portions of said interlock member;
   a locking element projecting from said first portion in a direction generally parallel to said hook elements for selective projection into one of such slots of such a support member on which said bracket assembly is engaged;
   a cam section projecting from said second portion in a direction generally parallel to said hook elements for selective projection into one of such slots of such support member;
   said locking element being disposed, longitudinally of said bracket, such that it will abut such support member without entering one of said slots therein as said hooks are moved transversely into their respective slots and will be aligned with one of said slots in the course of such downward movement of said bracket by which said hooks are engaged;
   said cam section being disposed, longitudinally of said bracket, such that it will extend into one of said slots as said hooks are so moved transversely into their respective slots;
   said cam section having a cam surface positioned to engage such support member at the lower edge of the respective slot during such downward movement of said bracket to cause retractive movement of said cam section and thereby to rotate said interlock member to extend said locking element into its respective aligned slot in the course of such downward movement of said bracket; and
   the configuration and relative positioning of said hooks and said locking element being such that said locking element engages such support member in the respective slot to preclude vertical movement of said bracket which would permit transverse disengagement of said hooks from their respective slots.

3. In a mounting bracket including at least one projecting hook for engaging a mounting member which includes a mounting wall having a plurality of spaced engagement apertures for receiving said at least one hook, a locking system for locking said mounting bracket to said mounting member comprising:
   a latch member mounted on said mounting bracket for relative pivotal movement about a pivot axis and including latch arm portions on opposite sides of said pivot axis, said pivot axis disposed transversely relative to said hook;

a cam section on one of said latch arms, said cam section including a cam surface disposed to abut one edge of one of said mounting member apertures and rotate the opposite latch arm portion outwardly in the direction of projection of said hook as said mounting bracket is moved longitudinally of said plurality of spaced mounting surface apertures and as said hook is engaged in one of said mounting surface apertures and to prevent counter-rotation of said opposite latch arm when said hook is engaged in one of said mounting surface apertures; and a locking tab on the other of said latch arms and disposed to engage into one of such mounting member apertures in a locked position and thereby prevent reverse longitudinal movement of said mounting bracket relative to said mounting surface apertures when said latch member is so rotated by engagement of said cam surface with such one edge.

4. The invention of claim 3 including a locking tab stop for limiting travel of said locking tab in the direction of movement for engagement in said mounting member aperture.

5. The invention of claim 3 further comprising means for disengaging said locking tab from such mounting member as said hook is simultaneously disengaged from one of such mounting member apertures.

6. The invention of claim 5 wherein said means for disengaging said locking tab includes a thumb tab attached to said other of said latch arms and extending transverse to said locking tab.

7. The invention of claim 3 wherein said mounting bracket defines a recess and wherein said locking tab is disposed in said recess.

8. The invention of claim 3 wherein said cam section and said locking tab are in generally coplanar alignment with said hook.

9. In a mounting bracket of the type having means for securing an office component thereto and at least one projecting hook for engaging a vertical support which includes a plurality of spaced engagement slots disposed in a linear array for receiving said hook, an interlock member for locking said mounting bracket to said support comprising:

a latch member mounted on said mounting bracket for relative pivotal movement about a pivot axis and including latch arm portions on opposite sides of said pivot axis, said pivot axis disposed transversely relative to said hook;

a cam section on one of said latch arms, said cam section including an outwardly extending cam surface disposed to abut one edge of one of said support slots and rotate the opposite latch arm portion outwardly in the direction of projection of said hook as said hook is engaged in one of said support slots and to prevent counterrotation of the opposite latch arm when said hook is engaged in one of said support slots;

a locking tab on the other of said latch arms and aligned with said hook for engaging one of said support slots in a locked position when said latch member is so rotated by engagement of said cam surface with said one edge, said locking tab preventing said hook from disengaging the support when said locking tab is so engaged in the respective slot; and said mounting bracket including a recess, said locking tab being disposed in said recess, whereby movement of said locking tab and of said latch member are restricted.

10. The invention of claim 8 further comprising a thumb tab attached to said latch arm portions and disposed transverse to said locking tab for disengaging said locking tab from said support slot as said hook is simultaneously disengaged from the respective slot.

11. A mounting bracket assembly for supporting office furnishing components on supports provided with a plurality of engagement slots, comprising a bracket and at least one hook element projecting transversely from said bracket and longitudinally thereof for engaging such a support in one of such slots by movement of said bracket transversely and then longitudinally of such a support, an interlock including an arm pivotally mounted on said bracket, first and second portions of said arm extending generally longitudinally of said bracket on opposite sides of such pivotal mounting, a locking projection on said first arm portion and projecting therefrom in the same direction as the transverse projection of said hook for selectively extending into a first such slot, a cam section on said second arm portion and projecting therefrom in the same direction as the transverse projection of said hook and said locking projection for selectively extending into a second of such slots, said cam section being positioned for insertion into such second slot as said hook is inserted into such one of said slots, said cam section having a cam surface positioned to engage such support at the edge of such second slot as said bracket thereafter is moved longitudinally of such support for engagement of said hook thereon and thereby to rotate said arm to extend said locking projection transversely of said bracket, said locking projection being positioned to abut such a support adjacent such first slot as said hook and said cam section are so inserted and for alignment with such first slot as said bracket is so moved longitudinally of such support, whereby said arm is rotated by such engagement of said cam surface on said support to extend said locking projection into such first slot during such longitudinal engagement movement of said bracket, and said locking projection disposed to thereafter engage such support at one end of such first slot to preclude reverse longitudinal movement of said bracket relative to said support for transverse realignment of said hook with the respective slot, thereby precluding transverse disengagement of said hook from said support.

* * * * *